(12) United States Patent
Bergeler

(10) Patent No.: US 10,539,304 B2
(45) Date of Patent: Jan. 21, 2020

(54) LIGHT AND LIGHTING SYSTEM

(71) Applicant: DIEHL AEROSPACE GMBH, Ueberlingen (DE)

(72) Inventor: Swen Bergeler, Allershagen (DE)

(73) Assignee: DIEHL AEROSPACE GMBH, Ueberlingen (DE)

( * ) Notice: Subject to any disclaimer, the term of this patent is extended or adjusted under 35 U.S.C. 154(b) by 446 days.

(21) Appl. No.: 15/200,364

(22) Filed: Jul. 1, 2016

(65) Prior Publication Data

US 2017/0001556 A1   Jan. 5, 2017

(30) Foreign Application Priority Data

Jul. 4, 2015   (DE) .................. 10 2015 008 777

(51) Int. Cl.
| | |
|---|---|
| *B64D 47/02* | (2006.01) |
| *F21V 21/14* | (2006.01) |
| *B60Q 3/53* | (2017.01) |
| *B60Q 3/43* | (2017.01) |
| *B60Q 3/78* | (2017.01) |
| *B64D 11/00* | (2006.01) |
| *F21V 21/005* | (2006.01) |
| *F21V 21/34* | (2006.01) |

(52) U.S. Cl.
CPC ............... *F21V 21/14* (2013.01); *B60Q 3/43* (2017.02); *B60Q 3/53* (2017.02); *B60Q 3/78* (2017.02); *B64D 11/00* (2013.01); *B64D 47/02* (2013.01); *F21V 21/005* (2013.01); *F21V 21/34* (2013.01); *B64D 2011/0038* (2013.01)

(58) Field of Classification Search
CPC .......... B60Q 3/0206; B60Q 3/78; B60Q 3/43; B60Q 3/53; B64D 47/02; F21V 21/005; F21V 21/14; F21V 21/34
USPC ......................................................... 362/471
See application file for complete search history.

(56) References Cited

U.S. PATENT DOCUMENTS

| | | | | |
|---|---|---|---|---|
| 6,158,882 | A * | 12/2000 | Bischoff, Jr. | ......... F21V 23/005 362/249.02 |
| 8,267,557 | B2 * | 9/2012 | Vogel | ..................... B64D 11/00 362/471 |
| 2007/0170452 | A1 * | 7/2007 | Kurokawa | ........... G02B 6/0083 257/99 |
| 2010/0008090 | A1 * | 1/2010 | Li | .......................... F21V 17/007 362/249.03 |
| 2012/0120644 | A1 * | 5/2012 | Rieger | ...................... F21S 4/00 362/219 |

(Continued)

FOREIGN PATENT DOCUMENTS

DE        2310715 A1    9/1974

*Primary Examiner* — Elmito Breval
(74) *Attorney, Agent, or Firm* — Scully Scott Murphy and Presser

(57) ABSTRACT

A light for an interior of a vehicle is provided. The light has two or more light modules. In an installed state, the light modules are mounted on a supporting structure in the vehicle and disposed in series along a profile line. In the installed state, each two adjacent light modules are fixedly attached to each other, such that all light modules that are fixedly attached to each other together form an integral light strip. The light strip has a first region and at least one second region. The first region of the light strip is fixedly attached to the supporting structure. The at least one second region of the light strip is movably supported on the supporting structure.

12 Claims, 2 Drawing Sheets

(56) References Cited

U.S. PATENT DOCUMENTS

| | | | |
|---|---|---|---|
| 2013/0329445 A1* | 12/2013 | Oh | B60Q 1/0041 |
| | | | 362/543 |
| 2014/0003072 A1* | 1/2014 | Yamamoto | B60Q 1/268 |
| | | | 362/503 |
| 2014/0140082 A1* | 5/2014 | Kuboyama | H01L 25/0753 |
| | | | 362/510 |
| 2014/0211449 A1* | 7/2014 | Nomura | B60Q 1/302 |
| | | | 362/84 |
| 2014/0268845 A1* | 9/2014 | Davis | B60Q 1/2661 |
| | | | 362/492 |

* cited by examiner

LIGHT AND LIGHTING SYSTEM

The present invention is directed a light for an interior of a vehicle, wherein the light contains at least two light modules. In an installed state, the light modules are mounted on a supporting structure of the vehicle and are disposed in series along a profile line.

DISCUSSION OF THE PRIOR ART

In vehicles, such as for example buses, trains and aircraft, a plurality of light modules are disposed one after the other in series, i.e. along a profile line, so as to produce light in the form of a strip of light. The light modules are mounted on a supporting structure that is in turn fixedly installed in the vehicle. With conventional systems, gaps between light modules can be provided or can arise that are caused by thermal expansion and tolerances. Some gaps between light modules cause an unwanted lack of brightness in the interior, for example on the ceiling and walls thereof, i.e. regions that are not illuminated, as a rule strips. Owing to manufacturing tolerances in the light modules, the gaps between different light modules can be of different sizes. Moreover, horizontal misalignments are possible, which produce unsightly effects on walls and ceiling, for example waves or steps.

A corresponding lighting system contains the light and the supporting structure.

SUMMARY OF THE INVENTION

The present invention relates to an improved light and an improved lighting system.

The light for an interior of a vehicle contains at least two light modules. The vehicle is in particular an aircraft, the interior in particular a passenger cabin. In an installed state, the light modules are mounted on a supporting structure in the vehicle. The installed state refers to that state in which the light modules are installed in the interior of the vehicle ready to operate or during operation. As a rule, the supporting structure is fixedly and immovably installed in the vehicle for this. In the installed state, the light modules are moreover disposed in series along a profile line.

In the installed state, each two adjacent light modules are attached to each other at respective regions in a fixed mutually relative position. All light modules are attached to each other in series and together form a light strip. At least the regions of the light strip or light modules that are actually fixed to each other are positionally fixed relative to each other. The light strip is attached with exactly one first region to the supporting structure in a fixed relative position to the supporting structure, in particular with a first mounting arrangement. At least one second region of the light strip is movably supported on the supporting structure in a variable position relative to the supporting structure. This is carried out in particular with exactly one or a plurality of second mounting arrangements, each associated with a second region. The first and respective second regions are thus mounted on the supporting structure. "Mounting" includes attachment and movable support.

The invention is based on the following observations and findings: in practice, it is possible, during the integration of lights in vehicles, primarily aircraft, to plan in a safety distance between each two adjacent light modules. Thus, for one thing, a "worst case" tolerance is taken into account in the basic dimensions of the light modules. For another thing, a maximum material expansion or change in expansion that the light modules can undergo in the event of temperature changes is taken into account. For this the entire temperature range to which the light module can be exposed is taken into account. The safety distance guarantees that each two light modules can never come together even under adverse conditions.

In practice, it is usual to perform a highly accurate material expansion calculation and to select the safety distance to be as small as possible in order to minimize the size of the gaps occurring between two light modules. However, the size of said gaps between the individual light modules can be for example up to 10 mm, depending on the length of the whole light and the current temperature in the installed state or the operating state. In order to produce homogeneous illumination on the ceiling and walls of the interior, the light modules should abut each other with minimal gaps, so that there is continuous interrupt-free or gap-free illumination.

The invention is based on the knowledge that a gap between two light modules can be reduced to zero if light modules that are disposed one after the other, in particular linear lights, are joined by means of a simple clamp, if at the same time in doing so the light strip is fixed at one point, for example a light module, and is loosely supported at another point, for example at the remaining light modules. A material expansion can be allowed at the same time in this way.

The invention is based on the idea of fixedly joining together the individual light modules of a light in pairs and thus producing a light strip, at least in relation to the spaces between light modules that are fixed together. Said light strip consisting of the connected together light modules of the light is mounted on the supporting structure. In doing so, compensation of tolerances and thermal expansion should still be possible. Therefore, only a first region or a first point of the light strip is attached to the supporting structure. "Attachment" means here that the first region of the light strip is positionally fixed, which means fixed in a fixed position relative to the supporting structure. The first region is hereby preferably a region of exactly one of the light modules, but can also comprise a joining arrangement and/or segments of two light modules.

At second points or in second regions of the light strip, the same is movably supported on the supporting structure. "Movable support" means in this case that the light strip is indeed mounted on the supporting structure by means of the respective second regions, but can move relative to the supporting structure to compensate for manufacturing tolerances or thermal expansion. The relative position of the second region relative to the supporting structure can thus be changed, i.e. is variable, in the sense of the compensation of tolerances etc. The second regions are in particular respective regions of an arbitrary light module, but can also comprise a joining arrangement and/or segments of two light modules.

At least in relation to the first region, a defined position of the light strip relative to the supporting structure is defined. A tolerance compensation, for example for thermal expansion, etc. can be carried out by means of the mobility of the second regions of the light strip.

In the light according to the invention, the separation between each two light modules can therefore be set arbitrarily, in particular arbitrarily reduced, without having to forego a tolerance compensation or thermal expansion compensation for the light.

By producing the stable light strip or owing to the defined joining of abutting light modules, unwanted offsets between said modules can be avoided. The light modules can for example be precisely oriented in alignment along the profile line. Said orientation can also not change owing to the mutual fixing.

In a preferred embodiment, in the installed state each of the light modules comprises at least the first or one of the second regions. Each of the light modules is thus fixedly or movably mounted at at least one point on the supporting structure. Thus all light modules are securely mounted on the supporting structure.

In a preferred embodiment, the light contains exactly one first mounting arrangement, which is designed for the attachment of the first region to the supporting structure, in particular as a fixed holder, and a respective second mounting arrangement. This means that exactly one second mounting arrangement is associated with each second region. Said mounting arrangements are designed for the respective movable support of a respective second region on the supporting structure, in particular as a sliding holder. The light also contains respective joining arrangements, which are designed for the attachment of the light modules to each other. Owing to the mounting arrangement, simple mounting of the light strip on the supporting structure is carried out, and simple manufacture of the light strip from the individual light modules is carried out owing to the joining arrangements. The first and/or second mounting and/or joining arrangements can for example be implemented as clamps. Joining and mounting arrangements can also be implemented as common parts, in particular if the first or one of the second regions extends across a joining arrangement.

In a version of said embodiment, the first mounting arrangement is a fixed holder that can be positionally fixed on the supporting structure and to the light strip. The second mounting arrangement is alternatively or additionally a sliding holder that is fixed to the light strip but movable relative to the supporting structure. The respective second region of the light module or the light strip thus moves relative to the supporting structure by means of the sliding holder. The sliding holder gives the advantage that it can be displaced so as to slide for example along a line or a plane on a suitable supporting structure and thus effects the movable support. Alternatively or additionally, the joining arrangement is a joining clamp. The latter can be mounted particularly simply by pushing on the same.

In particular, the sliding holder is movable relative to the supporting structure along a direction of motion or within a plane of motion. In other words, the sliding holder is movable relative to the supporting structure in one dimension or in two dimensions. The direction of motion and the plane of motion extend in particular parallel to the profile line, i.e. the sliding holder is fixed in a plane perpendicular to the profile line or the sliding holder is fixed in a direction perpendicular to the profile line.

In a preferred embodiment, one of the light modules comprises the first region and at least one second region. Alternatively or additionally, at least one of the remaining light modules comprises at least two second regions. The light modules involved are then mounted on the supporting structure at at least two points in each case, which enables a respective secure mounting but also tolerance compensation within the respective light module relative to the supporting structure.

In a preferred embodiment, in the installed state each two light modules are attached to each other with a defined separating distance. In particular, the joining arrangement is thus designed to join each two lights to each other at a defined distance. The joining arrangements are then configured such that the lights have a defined separation on the respective mutually facing sides thereof in the installed state, i.e. a defined gap between each two light modules is guaranteed. The corresponding distance then always corresponds to the defined distance, even in the event of arbitrary tolerances and thermal expansion, as said distance is defined by the joining arrangement alone. This presents a visually pleasing appearance in the installed state.

In a preferred version of said embodiment, the defined distance is selected such that each two light modules are attached to each other without gaps. The aforementioned distance is zero as a rule in this case, which means the light modules touch each other at the corresponding sides, as a rule on the end faces in the case of oblong light modules.

In a preferred embodiment, the light modules comprise respective end faces. In the installed state, the respective end faces of two adjacent light modules face each other. The light modules are then configured such that they are light-emitting up to the respective end faces. In other words, the lights radiate light up to the respective end faces or to the edge. In particular, in connection with the aforementioned gap-free arrangement relative to each other, there is thus a gapless appearance regarding light emission by the individual light modules or the entire light strip. In the ideal case, the respective boundaries between individual light modules are then practically no longer detectable or are no longer noticeable. In this case, the end faces of a light module can also be the corresponding end faces of an end cap mounted on the light module.

Regarding the lighting system, the object is achieved by a lighting system according to claim 9. Said claim comprises a light according to the invention as well as a supporting structure that can be fixed within a vehicle. The lighting system thus comprises both the supporting structure and also the light strip to be attached thereto. The supporting structure and the light strip form a matched system in this case. Incompatibilities between the light modules or the light strip and the supporting structure are thus avoided.

In a preferred embodiment, the supporting structure extends along, in particular parallel to, the profile line. As the light strip is as a rule mounted closely on the supporting structure, the profile of the supporting structure then—at least coarsely—determines the profile line for the light strip. The supporting structure extends in particular along a straight line.

In a preferred embodiment, the supporting structure is a supporting rail. The supporting rail can hereby be continuous or implemented as a series of rail segments, wherein rail segments are only provided at each location of a respective support, for example at the location of the mounting arrangement. A rail gives the advantage that a movable support can be implemented particularly favourably here, in particular using a sliding holder. Then a rail does not absolutely have to be provided at the location of the first mounting arrangement, as there is a fixing here that is positionally fixed anyway.

The invention including different embodiments can be summarized as follows:

According to the invention, joining light modules to each other in a stable structure in the form of a light strip is carried out, wherein at the same time thermal expansion of the light strip relative to a supporting structure or the vehicle is enabled. Furthermore, according to the invention a homogeneous surface illumination in the interior is enabled, because the light strip can be configured as a gap-free, homogeneously illuminating light source. For example, between two light modules there are then only the caps thereof, which are again in contact. Owing to the adaptation of the joining arrangement, desired gap dimensions can be set between two adjacent light modules. Overall, a product improvement for a light or a lighting system is the result.

According to the invention, an optimized mounting or fixing of light modules that are disposed in series or one after the other results. The invention describes a concept for the attachment of a plurality of light modules, which is optimized with respect to the distances between each two adjacent light modules. Owing to a suitable combination of mounting and joining arrangements, for example fixed and sliding holders and additional joining clamps, the distance between the light modules can be determined or defined fixedly and in the installed state invariantly for all thermal expansion and tolerance deviations.

Owing to the overall mobility of the light strip and the fixed, for example rigid connection between each two light modules, improved orientation of the light modules can be carried out. In order to achieve illumination without the known dark strips, no particularly long light modules are necessary, but even short light modules can be disposed close together or without gaps in a suitably visually pleasing manner. The invention is suitable for use in all vehicles or aircraft and can as a rule also be used in already existing instances, for example can be retrospectively fitted, if a suitable supporting structure is already present there. Only the mounting arrangements sometimes have to be adapted in order to enable suitable attachment to the existing supporting structure.

BRIEF DESCRIPTION OF THE DRAWINGS

Further features, effects and advantages of the invention are revealed by the following description of a preferred exemplary embodiment of the invention as well as the accompanying figures. The figures show in a schematic basic sketch.

DETAILED DESCRIPTION OF THE INVENTION

Figure 1:
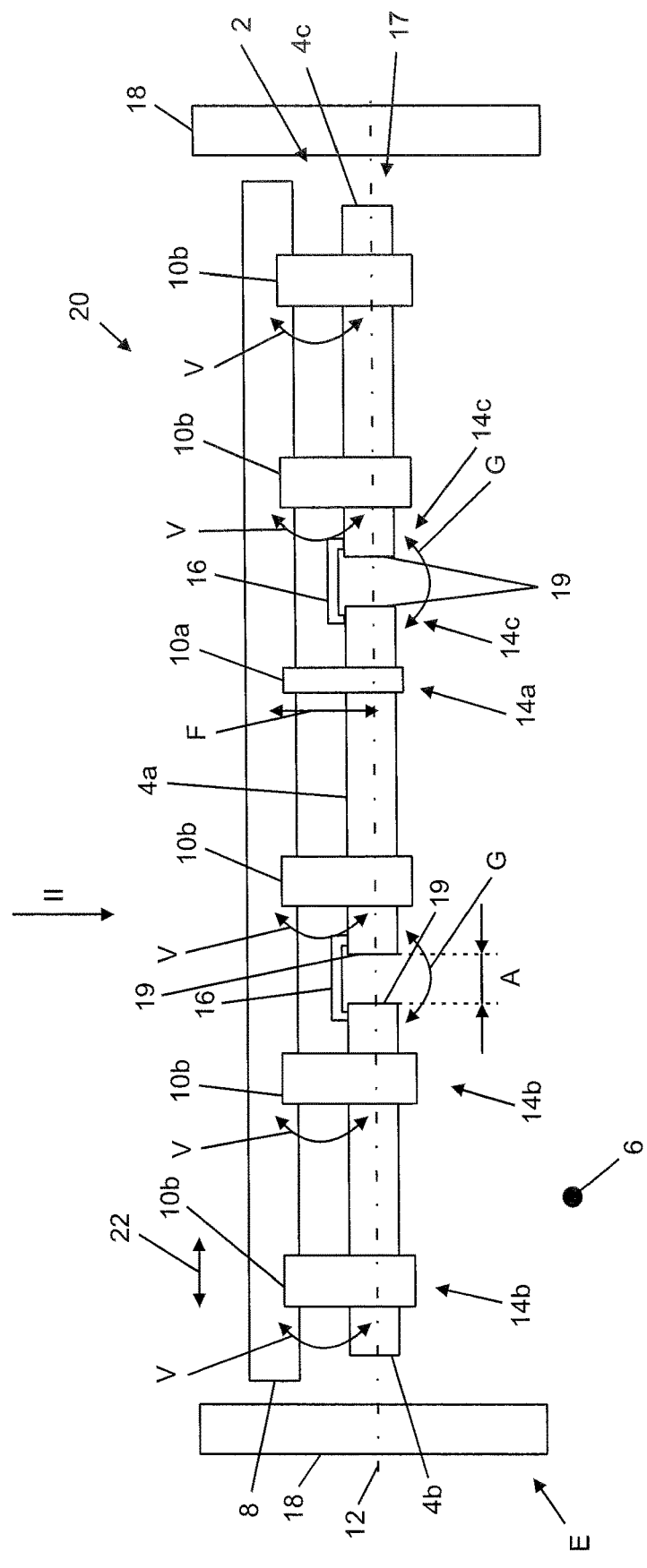
FIG. 1 a lighting system in a side view,
FIG. 2 an alternatives lighting system in a top view.

FIG. 1 shows a light 2 that contains a total of three light modules 4a-c. The light is installed in an interior 6 of a vehicle that is not illustrated further, in this case of an aircraft, and is located between two dividing walls 18 of the interior 6. The light 2 is disposed in an installed state E, and is thus mounted in the aircraft and ready for use.

The light 2 contains two joining arrangements 16, here in the form of clamps. Each of the joining arrangements 16 is used to join the respective adjacent light modules 4a and 4b or 4a and 4c to each other in a fixed mutual relative position G. Here too the relative position more precisely relates to the respective regions 14c or end segments of the light modules 4a-c that the joining arrangements 16 engage. The regions 14c face each other in the installed state E. Respective end faces 19 of the light modules 4a-c face each other. The joining arrangements 16 are in this case configured so that there is a certain non-zero distance A, in this case 5 mm, between each two adjacent light modules 4a-c or end faces 19. In the installed state E, the light modules 4a-c are oriented so as to abut each other in series along a profile line 12, in this case a straight line. The light modules 4a-c joined with the joining arrangements 16 together form a light strip 17.

For assembling the light strip 17 in the aircraft, a supporting structure 8—here in the form of a straight rail—is fixedly installed for its part in the interior 6 or rather in the aircraft. Using mounting arrangements 10 a, b—in this case clamps for the rail—the light strip 17 or the light modules 4a-c is/are mounted on the supporting structure 8 and hence in the vehicle. The light 2 contains exactly one first mounting arrangement 10a for this. Said mounting arrangement 10a fixes the light strip 17 by means of the light module 4a in a fixed relative position F relative to the supporting structure 8, here symbolized by a double arrow. More precisely, a suitable region 14a of the light module 4a that is engaged by the mounting arrangement 10a is fixed in the fixed relative position F.

The light strip 17 is otherwise fixed to the supporting structure 8 by means of the second mounting arrangement 10b, both by means of the light module 4a and also by means of the further light modules 4b. This enables the movable support of each of the respective light modules 4a-c in a respective variable position V relative to the supporting structure 8—again symbolized by a double arrow. More precisely, the corresponding regions 14b, which are engaged by the mounting arrangement 10b on the respective light modules 4a-b, are again movably supported in the corresponding variable relative position V. The mounting arrangements 10a,b are each fixedly attached to the light modules 4a-c in this case.

The second mounting arrangements 10b are implemented here as sliding holders that are movable along the rail in one dimension. Said second mounting arrangements each enable a movement of the mounting arrangement 10b and the regions 14b along a direction of motion 22, which extends parallel to the profile line 12 or along the supporting structure 8 here.

By means of the fixing of said region 14a, the entire light strip 17 is also in principle fixed in the aircraft relative to the installation position thereof. Movements of the light strip 17 owing to thermal expansion only take place in the remaining regions of the light strip 17. The light 2 and the supporting structure 8 in total together form a lighting system 20.

Figure 2:
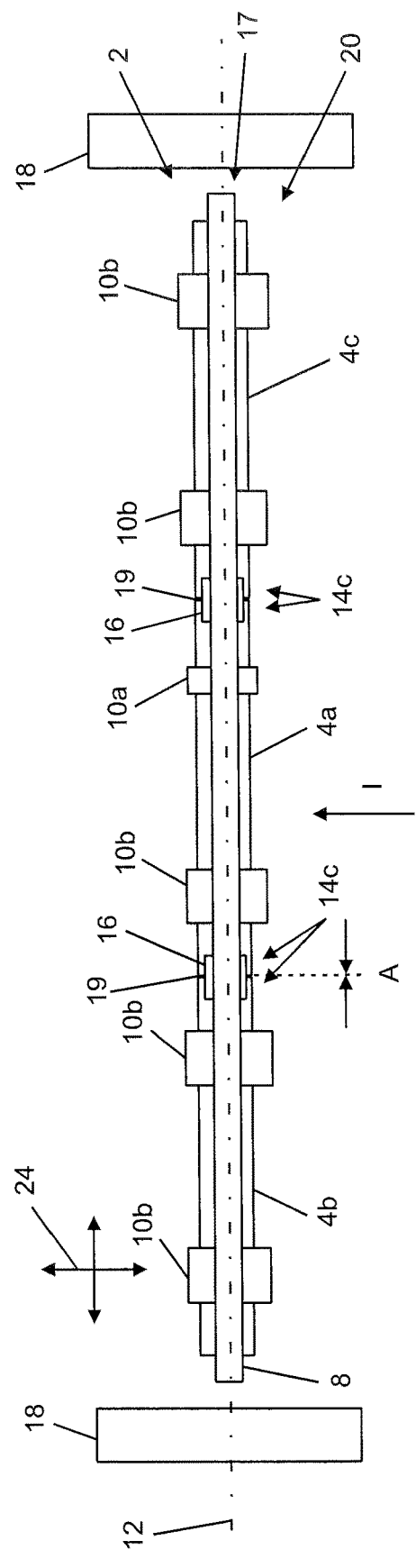

FIG. 2 shows, in the direction of the arrow II of FIG. 1, a modified lighting system 20 in which altered joining arrangements 16 form an altered light strip 17. The alternative joining arrangements 16 join the respective light modules 4a-c to each other without gaps. The distance A between each two adjacent light modules 4a-c is thus zero. The end faces 19 of the light modules 4a-c abut each other without gaps, i.e. they are touching. The light modules 4a-c are moreover implemented so that they emit light up to the end faces 19. The zero gap between the light modules 4a-c is therefore practically no longer visible. In both lights 2 according to FIGS. 1 and 2, light is emitted mainly in the direction of the arrow II of FIG. 1, i.e. in the plane of the drawing in FIG. 2.

The second mounting arrangements 10b are implemented here as sliding holders that are movable along the rail in two dimensions. This enables in each case a movement of the mounting arrangement 10b and the regions 14b within a plane of motion 24, which extends here in the figure parallel to the plane of the figure. The plane of motion 24 extends both along and also transversely to the longitudinal direction of the supporting structure 8, i.e. parallel to the profile line 12 or along the supporting structure 8. The light strip 17 thus extends at a distance from and parallel to the plane 24.

In both cases of FIGS. 1 and 2, the light 2 is dimensioned so that the same cannot expand so far that it would contact the dividing walls 18 even under adverse conditions. In FIG. 2 the direction I is identified that indicates the direction of view of the arrangement of FIG. 1.

REFERENCE CHARACTER LIST 2 light
4a-c light module
6 interior
8 supporting structure
10a,b mounting arrangement
12 profile line
14a-c region
16 joining arrangement
17 light strip
18 dividing wall
19 end faces
20 lighting system
22 direction of motion
24 plane of motion
A distance
E installed state fixed relative
F position
G mutual relative position
V variable relative position

The invention claimed is:

1. A light for an interior of a vehicle,
wherein the light comprises at least two light modules,
wherein in an installed state the light modules are mounted on a supporting structure in the vehicle, and the light modules are disposed in series along a profile line, and
wherein in the installed state,
each two adjacent light modules are fixedly attached to each other, such that all light modules that are fixedly attached to each other together form an integral light strip, wherein the light strip has a first region and at least one second region,
the first region of the light strip is fixedly attached to the supporting structure, and
the at least one second region of the light strip is movably supported on the supporting structure.

2. The light according to claim 1, wherein the light comprises:
a first mounting arrangement that is configured for the fixed attachment of the first region to the supporting structure,
at least one second mounting arrangement that is configured for the movable support of the at least one second region on the supporting structure, and
at least one joining arrangement that is configured for the fixed attachment of the each two adjacent light modules to each other.

3. The light according to claim 2, wherein:
the first mounting arrangement comprises a fixed holder that is fixedly attached to the light strip and to the supporting structure, and
the second mounting arrangement comprises a sliding holder that is fixedly attached to the light strip and that is movable relative to the supporting structure.

4. The light according to claim 3, wherein said sliding holder is movable along a direction of motion or within a plane of motion, wherein the direction of motion and the plane of motion extend parallel to the profile line.

5. The light according to claim 1, wherein:
one of the light modules comprises the first region and at least one second region, and
at least one of the remaining light modules each comprises at least two second regions.

6. The light according to claim 1, wherein in the installed state, each two light modules are attached to each other with a defined separating distance.

7. The light according to claim 6, wherein the defined distance is selected so that each two light modules are attached to each other without gaps.

8. The light according to claim 1, wherein the light modules comprise respective end faces, with which the light modules face each other in the installed state, and the light modules are configured to emit light up to the respective end faces.

9. The light according to claim 1, wherein said vehicle is an aircraft.

10. A lighting system for an interior of a vehicle, comprising:
a supporting structure; and
a light,
wherein the light comprises at least two light modules,
wherein in an installed state the light modules are mounted on the supporting structure in the vehicle, and the light modules are disposed in series along a profile line, and
wherein in the installed state,
each two adjacent light modules are fixedly attached to each other, such that all light modules that are fixedly attached to each other together form an integral light strip, wherein the light strip has a first region and at least one second region,
the first region of the light strip is fixedly attached to the supporting structure, and
the at least one second region of the light strip is movably supported on the supporting structure.

11. The lighting system according to claim 10, wherein the supporting structure extends along the profile line.

12. The lighting system according to claim 10, wherein the supporting structure is a supporting rail.

* * * * *